US012679459B2

(12) United States Patent
    Delioglan et al.

(10) Patent No.: US 12,679,459 B2
(45) Date of Patent: Jul. 14, 2026

(54) METHOD FOR LIMITING A STEERING INTERVENTION OF A DRIVER ASSISTANCE SYSTEM

(71) Applicant: MERCEDES-BENZ GROUP AG, Stuttgart (DE)

(72) Inventors: Ugur Delioglan, Sindelfingen (DE); Daniel Keppler, Althengstett (DE); Thomas Weiskircher, Aidlingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 50 days.

(21) Appl. No.: 18/852,062

(22) PCT Filed: Feb. 7, 2023

(86) PCT No.: PCT/EP2023/053003
    § 371 (c)(1),
    (2) Date: Sep. 27, 2024

(87) PCT Pub. No.: WO2023/186387
    PCT Pub. Date: Oct. 5, 2023

(65) Prior Publication Data
    US 2025/0214650 A1      Jul. 3, 2025

(30) Foreign Application Priority Data
    Mar. 31, 2022    (DE) ..................... 10 2022 001 121.2

(51) Int. Cl.
    $B62D\ 15/02$      (2006.01)
    $B60W\ 30/12$      (2020.01)
    $B60W\ 60/00$      (2020.01)

(52) U.S. Cl.
    CPC ........... *B62D 15/025* (2013.01); *B60W 30/12* (2013.01); *B60W 60/0053* (2020.02); *B60W 2510/202* (2013.01); *B60W 2510/205* (2013.01)

(58) Field of Classification Search
    CPC .......... B60K 28/00–165; B60W 30/10; B60W 30/12; B60W 30/16; B60W 30/162;
    (Continued)

(56) References Cited

U.S. PATENT DOCUMENTS

2016/0252903 A1    9/2016   Prokhorov
    2017/0217477 A1    8/2017   Akatsuka et al.
    (Continued)

FOREIGN PATENT DOCUMENTS

DE      102008033688 A1      3/2009
    DE      102014208785 A1      11/2015
    (Continued)

OTHER PUBLICATIONS

International Search Report and Written Opinion dated May 2, 2023 in related/corresponding International Application No. PCT/EP2023/053003.
    (Continued)

*Primary Examiner* — Mark L. Greene
(74) *Attorney, Agent, or Firm* — PATENT PORTFOLIO BUILDERS PLLC

(57) ABSTRACT
A steering intervention of a driver assistance system of a vehicle is limited by generating a manipulated variable of the driver assistance system the steering intervention and multiplying it a weighting factor determined based on a detected manual steering intervention of a driver and based on a predefined permitted steering intervention of the driver.

9 Claims, 4 Drawing Sheets

Figure 1:
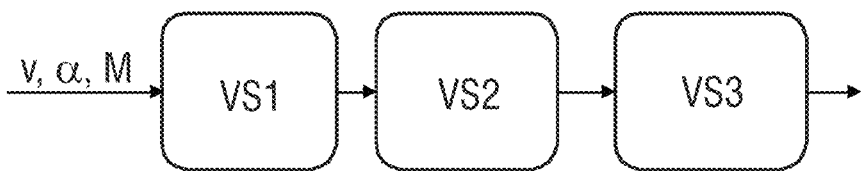

(58) Field of Classification Search
  CPC .............. B60W 30/165; B60W 30/17; B60W
                60/0053; B60W 2510/202; B60W
          2510/205; B62D 15/025; G05D 1/0061;
              G05D 1/0088; G05D 1/021; G05D
              1/0214; G05D 1/0221; G05D 1/0223
  See application file for complete search history.

(56)                  References Cited

U.S. PATENT DOCUMENTS

| | | |
|---|---|---|
| 2017/0282972 A1 | 10/2017 | Moretti |
| 2019/0009779 A1 | 1/2019 | Kim et al. |

FOREIGN PATENT DOCUMENTS

| | | |
|---|---|---|
| DE | 102014226781 A1 | 6/2016 |
| DE | 102018200327 A1 | 7/2019 |
| DE | 102018200388 A1 | 7/2019 |
| JP | 2008006857 A | 1/2008 |
| JP | 2015020604 A | 2/2015 |
| JP | 2016159781 A | 9/2016 |
| JP | 2018034770 A | 3/2018 |
| JP | 2020075564 A | 5/2020 |

OTHER PUBLICATIONS

Office Action dated Nov. 14, 2022 in related/corresponding DE Application No. 10 2022 001 121.2.
Office Action dated Feb. 17, 2026 in related/corresponding JP Application No. 2024-557443.

METHOD FOR LIMITING A STEERING INTERVENTION OF A DRIVER ASSISTANCE SYSTEM

BACKGROUND AND SUMMARY OF THE INVENTION

Exemplary embodiments of the invention relate to a method for limiting a steering intervention of a driver assistance system of a vehicle.

Such a method is known from DE 10 2008 033 688 A1, which discloses a method for operating a steering control unit for controlling a lateral movement of a vehicle in accordance with two setpoint variables generated outside the steering control unit. A first setpoint variable represents a steering angle or yaw rate setpoint value and is limited as a function of the speed. A second setpoint variable represents a steering torque setpoint value. A difference between the speed-dependent limited first setpoint variable and an actual value assigned to the first setpoint variable is determined as a control deviation, and the control deviation is converted into a manipulated variable in accordance with a predefined control function. The manipulated variable is limited by a weighting, a gradient limitation, and a value limitation on the basis of externally generated limitation parameters. The limited manipulated variable is added to the second setpoint variable to form a control signal for controlling a steering controller that acts on a steering system of the vehicle.

Furthermore, a method for operating a vehicle having a driver assistance system intervening in the lateral dynamics of the vehicle is known from DE 10 2018 200 388 A1. The method comprises the steps of:

detecting a driver intervention in a driving behavior of the vehicle due to an actuator intervention triggered by the driver assistance system;

interpreting the driver intervention as an override of the actuator intervention; and reducing, in a defined manner, the actuator intervention based on the interpretation of the driver intervention in such a way that a driving task is returned to the driver in a controlled and defined manner.

DE 10 2018 200 327 A1 describes a method for setting the level of assistance of a driver assistance system in a vehicle that can intervene autonomously in a vehicle unit that influences driving dynamics. A driver intervention leads to an override of an autonomous intervention carried out by the driver assistance system if an actuation intensity of the driver intervention exceeds a settable actuation limit value. The actuation limit value is set as a function of a relationship between the driver status and the quality of information on which an intervention by the driver assistance system is based.

A method for controlling a steering device of a vehicle is known from DE 10 2014 226 781 A1, in which setpoint values for an automated steering mode and for a manual steering mode are determined and are summed in a weighted manner in order to transition between the automated and manual steering modes.

Exemplary embodiments of the invention are directed to a novel method for limiting a steering intervention of a driver assistance system of a vehicle.

According to the invention, in a method for limiting a steering intervention of a driver assistance system of a vehicle, in order to limit the steering intervention, a manipulated variable of the driver assistance system generated for the steering intervention is multiplied by a weighting factor, wherein the weighting factor is determined based on a detected manual steering intervention of a driver and based on a predefined permitted steering intervention of the driver.

Lateral control of vehicles is made up, in particular, of superimposed planning and control of a vehicle movement by means of steering angle control in a steering system. It is necessary in this case to monitor the steering movement and limit it in the event of an error in order to ensure safety of the overall system. This means that particularly semi-automated driver assistance functions that intervene in the steering in a driving mode of a vehicle must be monitored by a driver at all times and steering interventions must be limited in such a way that the driver can control them. This limitation can take place in a steering actuator or in a master control unit.

The present method makes it possible to reliably and safely limit the steering intervention. A particularly harmonious transition can be achieved during a driver intervention, so that a steering feel is optimized during the driver intervention. Furthermore, a particularly highly reliable steering performance can be realized while the driver retains control over the vehicle.

According to a possible embodiment of the method, the permitted steering intervention is predefined based on a driving speed of the vehicle. This enables a further increase in the reliability and safety of the limitation of the steering intervention.

According to a further possible embodiment of the method, the manual steering intervention is detected using a steering angle speed and/or a steering angle and/or a manual torque applied to a steering handle of the vehicle. On the one hand, this enables a very reliable and easy-to-perform detection of the manual steering intervention and, on the other hand, very robust monitoring can be ensured by time-dependent monitoring of at least one of these variables.

According to a further possible embodiment of the method, the predefined permitted steering intervention is predefined upon detection of the manual steering intervention using the steering angle speed as a permitted steering angle speed and/or upon detection of the manual steering intervention using the steering angle as a permitted steering angle and/or upon detection of the manual steering intervention using the manual torque as a permitted manual torque.

According to a further possible embodiment of the method, the weighting factor is formed from a plurality of individual weighting factors, wherein an individual weighting factor is a steering angle speed weighting factor, which is determined based on the permitted steering angle speed predefined using the detected steering angle speed and the driving speed. This makes it possible to form the weighting factors in a simple and reliable manner.

According to a further possible embodiment of the method, in order to determine the steering angle speed weighting factor a deviation of an amount of the detected steering angle speed from the permitted steering angle speed is determined and is standardized to the permitted steering angle speed to form a standardized deviation of the detected steering angle speed, a robust steering angle speed deviation is determined from the standardized deviation of the detected steering angle speed in such a way that the standardized deviation of the detected steering angle speed only leads to the steering intervention being limited if the driver assistance system performing the steering intervention is active and a determined driver intervention falls below a predefined limit value, an error integral is formed as an integral of the robust steering angle speed deviation, and the steering angle speed weighting factor is determined from a characteristic map on the basis of a value of the error integral.

By means of this embodiment it is possible to robustly determine the steering angle speed weighting factor in a simple and reliable manner.

According to a further possible embodiment of the method, the weighting factor is formed from a plurality of individual weighting factors, wherein an individual weighting factor is a steering angle weighting factor that is determined based on a permitted steering angle predefined using the detected steering angle and the driving speed. This also makes it possible to simply and reliably form the weighting factor.

According to a further possible embodiment of the method, in order to determine the steering angle weighting factor a deviation of an amount of the detected steering angle from the permitted steering angle is determined and is standardized to the permitted steering angle to form a standardized deviation of the detected steering angle, a robust steering angle deviation is determined from the standardized deviation of the detected steering angle in such a way that the standardized deviation of the detected steering angle only leads to the steering intervention being limited if the driver assistance system performing the steering intervention is active and a determined driver intervention falls below a predefined limit value, an error integral is formed as an integral of the robust steering angle deviation, and the steering angle weighting factor is determined from a characteristic map on the basis of a value of the error integral.

By means of this embodiment, it is possible to robustly determine the steering angle weighting factor in a simple and reliable manner.

According to a further possible embodiment of the method, the weighting factor is formed from a plurality of individual weighting factors, wherein an individual weighting factor is a manual torque weighting factor is, which is determined based on the permitted manual torque predefined using the detected manual torque and the driving speed. This also makes it possible to simply and reliably form the weighting factor.

According to a further possible embodiment of the method, in order to determine the manual torque weighting factor a reduced manual torque is formed by subtracting a defined constant value from the permitted manual torque, the detected manual torque is compared with the reduced manual torque, if an amount of the detected manual torque is less than or equal to the reduced manual torque, the manual torque weighting factor is assigned the value 1, if the amount of the detected manual torque is greater than or equal to the reduced manual torque, the manual torque weighting factor is assigned the value 0, and if the amount of the detected manual torque is between the permitted manual torque and the reduced manual torque, the manual torque weighting factor is assigned a value between 0 and 1 that is determined in a linear scaling.

By means of this embodiment, it is possible to robustly determine the manual torque weighting factor in a simple and reliable manner.

BRIEF DESCRIPTION OF THE DRAWING FIGURES

Figure 2:
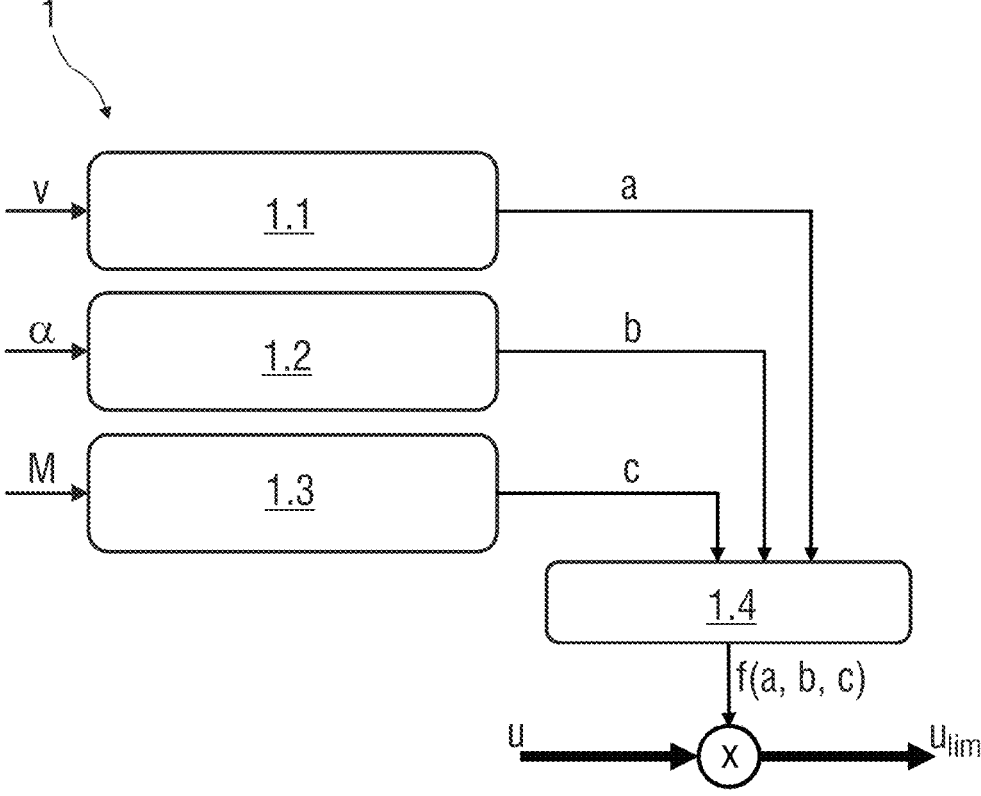
Figure 3:
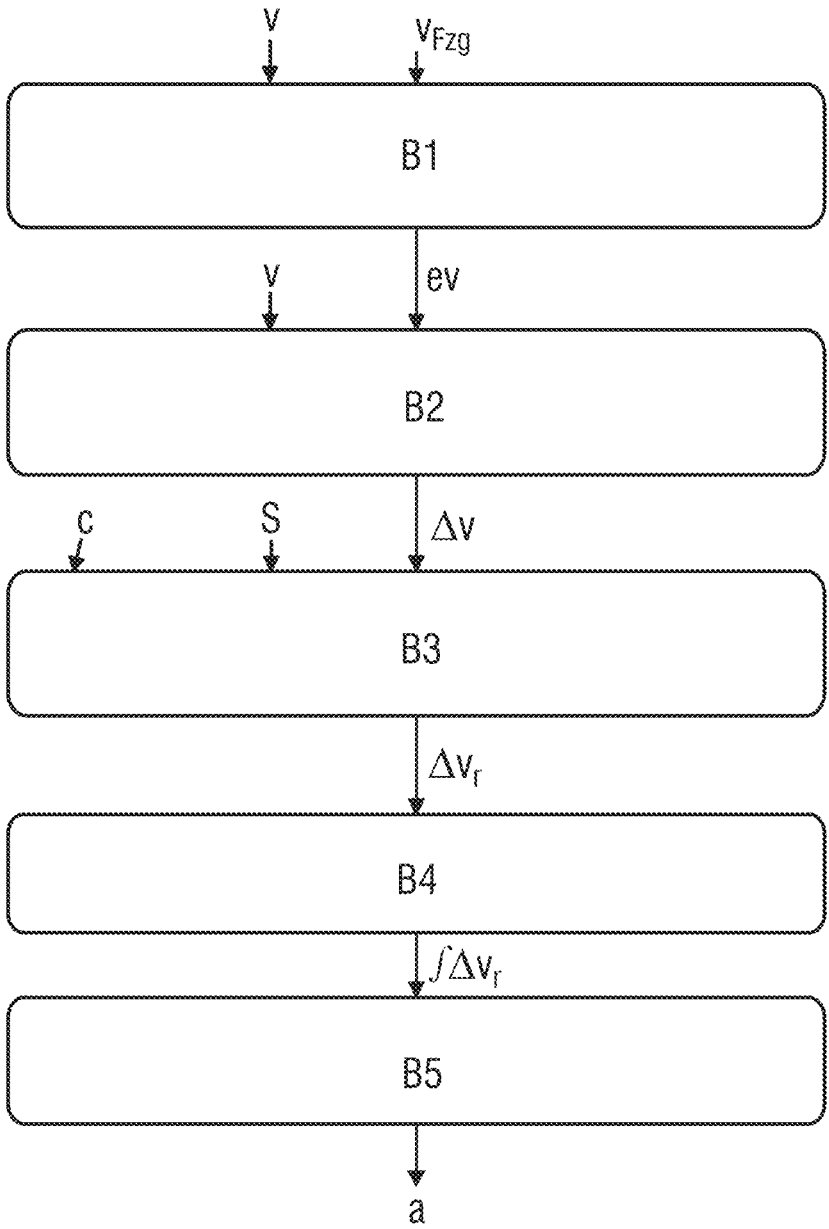
Figure 4:
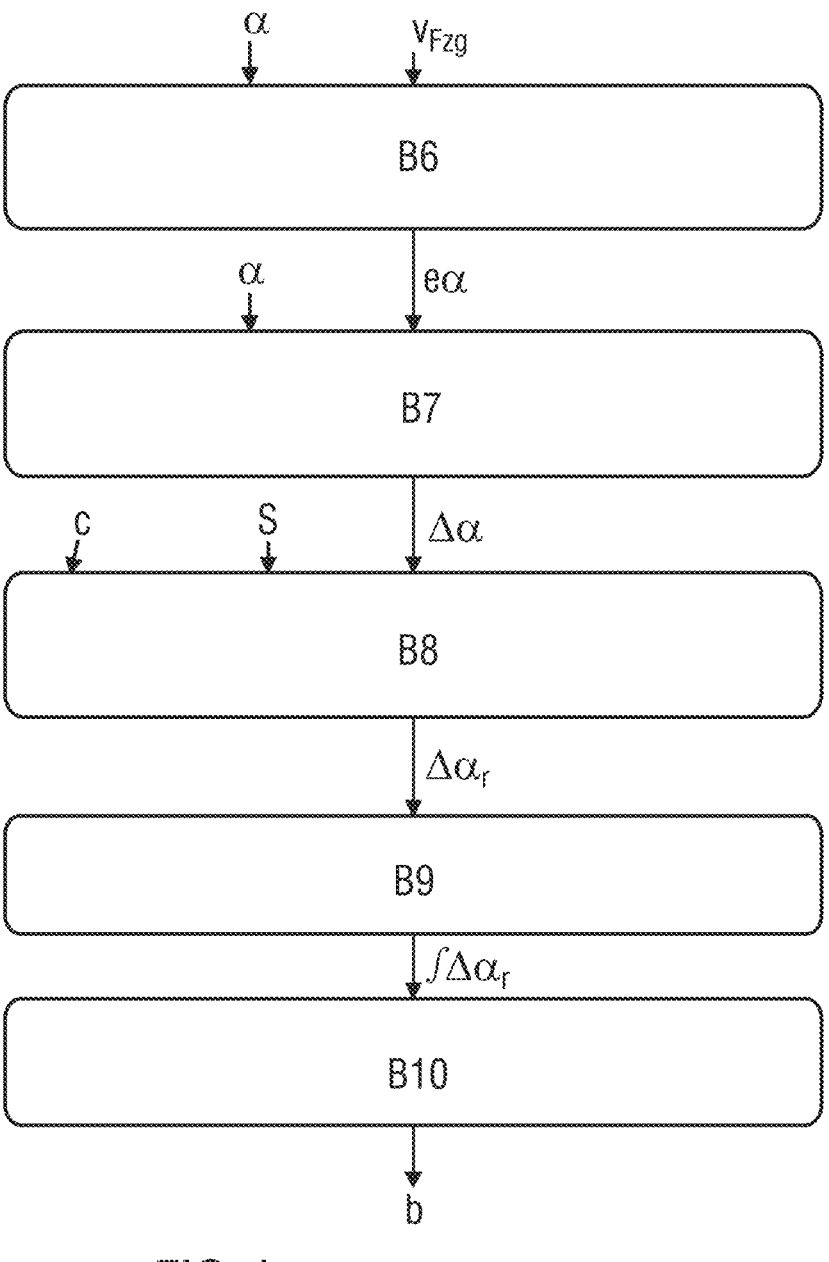
Figure 5:
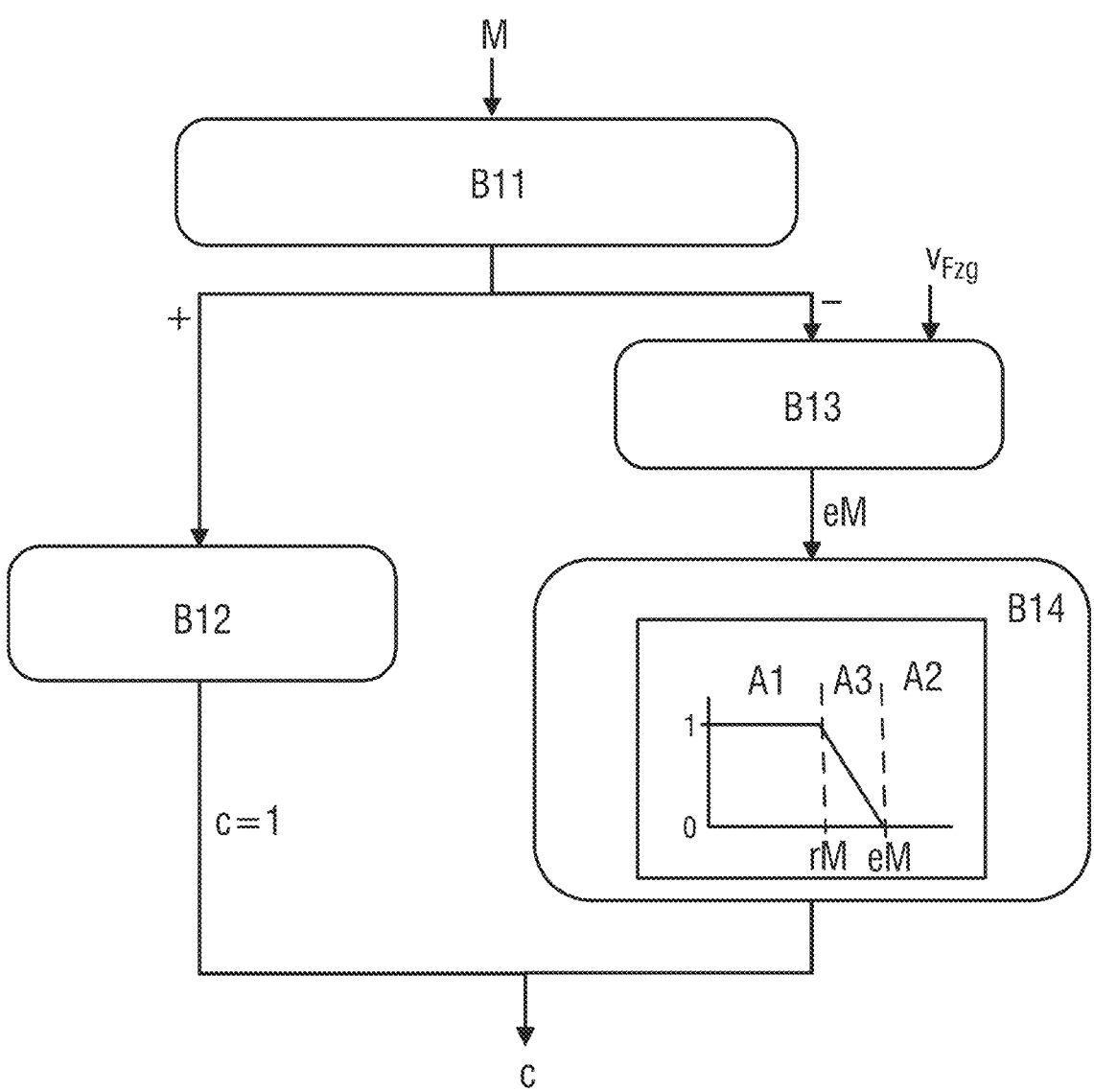

Exemplary embodiments of the invention are explained in more detail in the following with reference to drawings, in which:

FIG. 1 schematically shows a sequence of a method for limiting a steering intervention of a driver assistance system, FIG. 2 schematically shows a block diagram of a limiter for limiting a steering intervention of a driver assistance system, FIG. 3 schematically shows a possible sequence for generating an individual weighting factor for weighting a steering angle speed, FIG. 4 schematically shows a possible sequence for generating an individual weighting factor for weighting a steering angle, and FIG. 5 schematically shows a possible sequence for generating an individual weighting factor for weighting a manual torque.

Mutually corresponding parts are given the same reference signs in all of the figures.

DETAILED DESCRIPTION

FIG. 1 shows a sequence of a possible exemplary embodiment of a method for limiting a steering intervention of a driver assistance system of a vehicle.

Lateral control of vehicles is made up, in particular, of superimposed planning and control of a vehicle movement by means of steering angle control in a steering system. It is necessary in this case to monitor the steering movement and to limit it in the event of an error in order to ensure the safety of the overall system. This limitation can take place in a steering actuator or in a master control unit.

For this limitation, first of all, a manual steering intervention is detected in a method step VS1 by detecting a steering angle speed v and/or a steering angle $\alpha$ and/or a manual torque M applied to a steering handle of the vehicle.

In a second method step VS2, the detection is made more robust by means of time-dependent monitoring.

In a third method step VS3, the steering intervention of the driver assistance system is limited, in particular, by limiting a manipulated variable u shown in more detail in FIG. 2.

FIG. 2 shows a block diagram of a possible exemplary embodiment of a limiter 1 for limiting a steering intervention of a driver assistance system.

The limiter 1 comprises four modules 1.1 to 1.4: a first module 1.1 is a steering angle speed limiter, a second module 1.2 is a steering angle limiter, a third module 1.3 is a manual torque limiter, and a fourth module 1.4 is an overall limiter.

The first module 1.1 monitors the steering angle speed v and generates a steering angle speed weighting factor a as an individual weighting factor.

The second module 1.2 monitors the steering angle $\alpha$ and generates a steering angle weighting factor b as an individual weighting factor.

The third module 1.3 monitors the manual torque M and generates a manual torque weighting factor c as an individual weighting factor.

In the fourth module 1.4, all of the individual weighting factors are weighted and a weighting factor f (a, b, c) is generated as a function of the individual weighting factors.

The weighting factor f (a, b, c) can be calculated as a minimum function according to $$f(a, b, c) = \text{minimum}(a, b, c),$$

as a multiplication function according to $$f(a, b, c) = \text{multiplication}(a, b, c)$$

and/or as a mean function according to $$f(a, b, c) = \text{mean}(a, b, c).$$

The steering intervention is then limited by multiplying the manipulated variable u, which is, for example, a required setpoint steering rack force, by the weighting factor f (a, b, c) according to $$u_{lim} = f(a, b, c) * u,$$

resulting in a limited manipulated variable $u_{lim}$ for the driver assistance system.

In other words, in order to limit the steering intervention, the manipulated variable u of the driver assistance system generated for the steering intervention is multiplied by the weighting factor f (a, b, c). By forming the weighting factor f (a, b, c) as a function of the aforementioned individual weighting factors, the weighting factor f (a, b, c) is determined based on a detected manual steering intervention of a driver of the vehicle and based on a predefined permitted steering intervention of the driver.

FIG. 3 illustrates a possible sequence for generating the individual weighting factor for weighting the steering angle speed v, i.e., for generating the steering angle speed weighting factor a. This sequence takes place, for example, in the first module 1.1 according to FIG. 2.

Here, in a block B1, a permitted steering angle speed ev is calculated from a characteristic map as a function of the driving speed $v_{Fzg}$ based on input variables in the form of a driving speed $v_{Fzg}$ of the vehicle and the steering angle speed v.

This calculation of the permitted steering angle speed ev as a function of the driving speed $v_{Fzg}$ is carried out using a table with reference points, in which case the driving speed $v_{Fzg}$ in this table is plotted on a horizontal axis (x-axis) and the steering angle speed v is plotted on a vertical axis (y-axis), for example. Values between the reference points are determined with arbitrary, for example linear, interpolation methods. Reference points for values of the driving speed $v_{Fzg}$ are, for example, predefined in km/h, e.g. $v_{Fzg}=$ [0, 10, 20, 30, 50, 80, 100, 130, 180, 250]. Reference points for the permitted steering angle speed ev are determined, for example, via test drives and/or with the aid of simulation.

The aim here is to ensure that the steering angle speed v requirements for functional safety are met for the driver.

In a second block B2, a deviation of an amount of the detected steering angle speed v from the permitted steering angle speed ev is determined and standardized to the permitted steering angle speed ev. The result of the standardization is a standardized deviation Δv of the detected steering angle speed v, also referred to hereinafter as standardized steering angle speed deviation Δv.

In a third block B3, the standardized steering angle speed deviation Δv is filtered and a robust steering angle speed deviation $\Delta v_r$ is formed by the filtering. The filtering or the formation of the robust steering angle speed deviation $\Delta v_r$ is carried out in such a way that the standardized steering angle speed deviation Δv only leads to the steering intervention being limited if the driver assistance system performing the steering intervention is active and the driver does not intervene too strongly, in particular does not countersteer too strongly, for example countersteers against the steering intervention of the driver assistance system to a predefined extent at most.

The robust steering angle speed deviation $\Delta v_r$ can be calculated, for example, as follows:

$$\Delta v_r = \Delta v * S * c$$

where $\Delta v_r$ stands for the robust steering angle speed deviation $\Delta v_r$, Δv stands for the standardized steering angle speed deviation Δv filtered, S stands for a signal that represents the activation status of the driver assistance system performing the steering intervention and has the value 1 if the driver assistance system is active and otherwise has the value 0, and c is a driver intervention limiting factor that can assume values between 0 and 1 and has the value 0 if the driver intervenes too strongly, in particular countersteers too strongly, i.e., countersteers by more than the predefined extent against the steering intervention of the driver assistance system. The driver intervention limiting factor c is in particular the manual torque weighting factor c generated with the third module 1.3.

In a fourth block B4, an error integral $\int \Delta v_r$ is formed as an integral of the robust steering angle speed deviation $\Delta v_r$, wherein a lower limit of the error integral $\int \Delta v_r$, also referred to as a lower bound, is 0 in particular.

In a fifth block B5, the steering angle speed weighting factor is determined from a characteristic map on the basis of a value of the error integral $\int \Delta v_r$. The steering angle speed weighting factor a is calculated, for example, by means of a table with reference points, in which the value of the error integral $\int \Delta v_r$ is plotted on a horizontal axis (x-axis) and the steering angle speed weighting factor a is plotted on a vertical axis (y-axis). Values between the reference points are determined with arbitrary, for example linear, interpolation methods. Reference points for values of the error integral $\int \Delta v_r$ are for example predefined, e.g. $\int \Delta v_r=$[0, 1, 2, 5, 10, 50]. Reference points for the steering angle speed weighting factor a are determined via test drives and/or with the aid of simulation, so that, for example, a=[1, 1, 1, 1, 0, 0].

FIG. 4 illustrates a possible sequence for generating the individual weighting factor for weighting the steering angle α, i.e., for generating the steering angle weighting factor b. This sequence is carried out, for example, in the second module 1.2 according to FIG. 2.

Here, in a block B6, a permitted steering angle eα is calculated from a characteristic map as a function of the driving speed $v_{Fzg}$ on the basis of input variables in the form of the driving speed $v_{Fzg}$ and the steering angle α.

This calculation of the permitted steering angle eα as a function of the driving speed $v_{Fzg}$ is carried out using a table with reference points, in which case the driving speed $v_{Fzg}$ is plotted in this table on a horizontal axis (x-axis) and the permitted steering angle eα is plotted on a vertical axis (y-axis), for example. Values between the reference points are determined with arbitrary, for example linear, interpolation methods. Reference points for values of the driving speed $v_{Fzg}$ are, for example, predefined in km/h, e.g. $v_{Fzg}$= [0, 10, 20, 30, 50, 80, 100, 130, 180, 250]. Reference points for the permitted steering angle eα are determined, for example, via test drives and/or with the aid of simulation. The aim here is to ensure that the steering angle α requirements for functional safety are met for the driver.

In a second block B7, a deviation of an amount of the detected steering angle α from the permitted steering angle eα is determined and standardized to the permitted steering angle eα. The result of the standardization is a standardized deviation Δα of the detected steering angle α, also referred to hereinafter as standardized steering angle deviation Δα.

In a third block B8, the standardized steering angle deviation Δα is filtered and a robust steering angle deviation $Δα_r$ is formed by the filtering. The filtering or the formation of the robust steering angle deviation $Δα_r$ is carried out in such a way that the standardized steering angle deviation Δα only leads to the steering intervention being limited if the driver assistance system performing the steering intervention is active, given by the signal S, and the driver does not intervene too strongly, in particular does not countersteer too strongly, for example countersteers against the steering intervention of the driver assistance system to a predefined extent at most.

The robust steering angle deviation $Δα_r$ can be calculated, for example, as follows:

$$Δα_r = Δα * S * c$$

where $Δα_r$ stands for the robust steering angle deviation $Δα_r$, Δα stands for the standardized steering angle deviation Δα, S stands for the abovementioned signal representing the activation status of the driver assistance system, and c stands for the abovementioned driver intervention limiting factor, in particular for the manual torque weighting factor c generated with the third module 1.3.

In a fourth block B9, an error integral $\int Δα_r$ is formed as an integral of the robust steering angle deviation $Δα_r$, where a lower limit of the error integral $\int Δα_r$, also referred to as lower bound, is 0 in particular.

In a fifth block B10, the steering angle weighting factor b is determined from a characteristic map determined based on a value of the error integral $\int Δα_r$. The steering angle weighting factor b is calculated, for example, by means of a table with reference points, in which the value of the error integral $\int Δα_r$ is plotted on a horizontal axis (x-axis) and the steering angle weighting factor b is plotted on a vertical axis (y-axis). Values between the reference points are determined using arbitrary, for example linear, interpolation methods. Reference points for values of the error integral $\int Δα_r$ are for example predefined, e.g. $\int Δα_r$=[0, 1, 2, 5, 10, 50]. Reference points for the steering angle weighting factor b are determined via test drives and/or with the aid of simulation, so that for example b=[1, 1, 1, 1, 0, 0].

FIG. 5 illustrates a possible sequence for generating the individual weighting factor for weighting the manual torque M, i.e., for generating the manual torque weighting factor c. This sequence is carried out, for example, in the third module 1.3 according to FIG. 2.

In order to determine the manual torque weighting factor c, it is first determined in a first block B11 whether a detected manual torque M steers in the same direction + or in the opposite direction − to the manipulated variable u of the driver assistance system.

If the detected manual torque M is in the same direction +, then the manual torque weighting factor c is set to the value 1 in a second block B12.

If the detected manual torque M is in the opposite direction −, in a third block B13, a permitted manual torque eM is calculated from a characteristic map as a function of the driving speed $v_{Fzg}$ on the basis of the driving speed $v_{Fzg}$ input variable.

This calculation of the permitted amount of manual torque eM as a function of the driving speed $v_{Fzg}$ is carried out using a table with reference points, in which case the driving speed $v_{Fzg}$ in this table is plotted on a horizontal axis (x-axis) and the permitted manual torque eM is plotted on a vertical axis (y-axis), for example. Values between the reference points are determined using arbitrary, for example linear, interpolation methods. Reference points for values of the driving speed $v_{Fzg}$ are for example predefined in km/h, e.g. $v_{Fzg}$=[0, 10, 20, 30, 50, 80, 100, 130, 180, 250]. Reference points for the permitted manual torque eM are determined, for example, via test drives and/or with the aid of simulation. The aim here is to ensure that the manual torque M requirements for functional safety are met for the driver.

In a fourth block B14, a reduced manual torque rM is formed by subtracting a defined constant value, for example 0.5, from the permitted manual torque eM.

The detected manual torque M is subsequently compared with the reduced manual torque rM, and if an amount of the detected manual torque M is less than or equal to the reduced manual torque rM (shown in the section A1), the manual torque weighting factor c is assigned the value 1.

If, by contrast, the amount of the detected manual torque M is greater than or equal to the permitted manual torque eM (shown in the section A2), the manual torque weighting factor c is assigned the value 0.

When the amount of the detected manual torque M is between the permitted manual torque eM and the reduced manual torque rM (shown in the section A3), the manual torque weighting factor c is assigned a value between 0 and 1 that is determined in a linear scaling.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for limiting a steering intervention of a driver assistance system of a vehicle, the method comprising:

detecting a manual steering intervention of a driver of the vehicle;

generating a manipulated variable of the driver assistance system for the steering intervention of the driver assistance system;

determining, based on the detected manual steering intervention of the driver and a defined permitted steering intervention of the driver, a weighting factor;

multiplying the manipulated variable by the weighting factor; and controlling a steering actuator of the vehicle based on a product of the manipulated variable and the weighting factor, wherein the permitted steering intervention is defined based on a driving speed of the vehicle.

2. The method of claim 1, wherein the manual steering intervention is detected using:

a steering angle speed;

a steering angle; or a manual torque applied to a steering handle of the vehicle.

3. The method of claim 2, wherein the permitted steering intervention is defined upon detection of the manual steering intervention wherein:

a permitted steering angle speed is based on the detected steering angle speed;

a permitted steering angle is based on the detected steering angle; and/or a permitted manual torque is based on the detected manual torque.

4. The method of claim 3, wherein the weighting factor is formed from a plurality of individual weighting factors, wherein an individual weighting factor of the plurality of individual weighting factors is a steering angle speed weighting factor determined using the detected steering angle speed and the driving speed.

5. The method of claim 4, wherein to determine the steering angle speed weighting factor:

a deviation of an amount of the detected steering angle speed from the permitted steering angle speed is determined and is standardized to the permitted steering angle speed to form a standardized deviation of the detected steering angle speed;

a robust steering angle speed deviation is determined from the standardized deviation of the detected steering angle speed in such a way that the standardized deviation of the detected steering angle speed only leads to the steering intervention of the driver assistance system being limited when the driver assistance system performing the steering intervention is active and a determined driver intervention falls below a predefined limit value;

an error integral is formed as an integral of the robust steering angle speed deviation; and the steering angle speed weighting factor is determined from a characteristic map based on a value of the error integral.

6. The method of claim 3, wherein the weighting factor is formed from a plurality of individual weighting factors, wherein an individual weighting factor of the plurality of individual weighting factors is a steering angle weighting factor determined using the detected steering angle and the driving speed.

7. The method of claim 6, wherein to determine the steering angle weighting factor:

a deviation of an amount of the detected steering angle from the permitted steering angle is determined and is standardized to the permitted steering angle to form a standardized deviation of the detected steering angle;

a robust steering angle deviation is determined from the standardized deviation of the detected steering angle in such a way that the standardized deviation of the detected steering angle only leads to the steering intervention of the driver assistance system being limited if the driver assistance system performing the steering intervention is active and a determined driver intervention falls below a predefined limit value;

an error integral is formed as an integral of the robust steering angle deviation; and the steering angle weighting factor is determined from a characteristic map based on a value of the error integral.

8. The method of claim 3, wherein the weighting factor is formed from a plurality of individual weighting factors, wherein an individual weighting factor of the plurality of individual weighting factors is a manual torque weighting factor determined based on the permitted manual torque defined using the detected manual torque and the driving speed.

9. The method of claim 8, wherein to determine the manual torque weighting factor:

a reduced manual torque is formed by subtracting a defined constant value from the permitted manual torque;

the detected manual torque is compared with the reduced manual torque;

when an amount of the detected manual torque is less than or equal to the reduced manual torque, the manual torque weighting factor is assigned the value 1;

when the amount of the detected manual torque is greater than or equal to the permitted manual torque, the manual torque weighting factor is assigned the value 0; and when the amount of the detected manual torque is between the permitted manual torque and the reduced manual torque, the manual torque weighting factor is assigned a value between 0 and 1 that is determined in a linear scaling.

* * * * *